April 9, 1929.                    W. F. BOUCHÉ                    1,708,865
                                ELECTRICAL SYSTEM
                              Filed Dec. 31, 1925
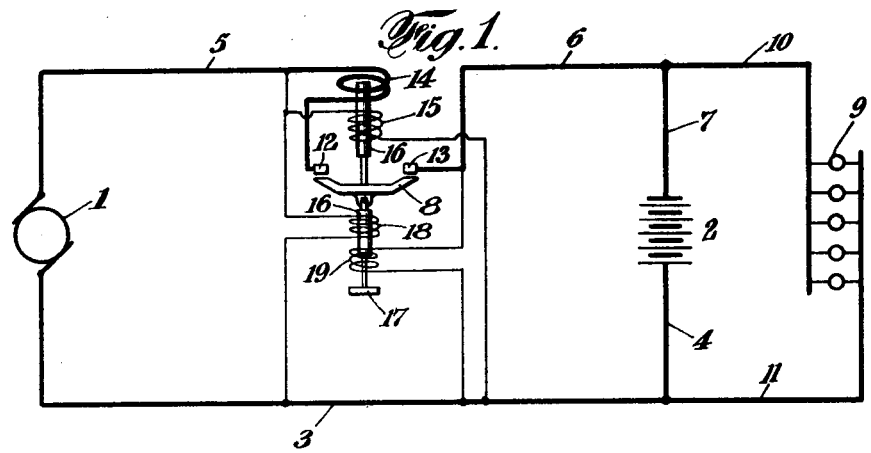
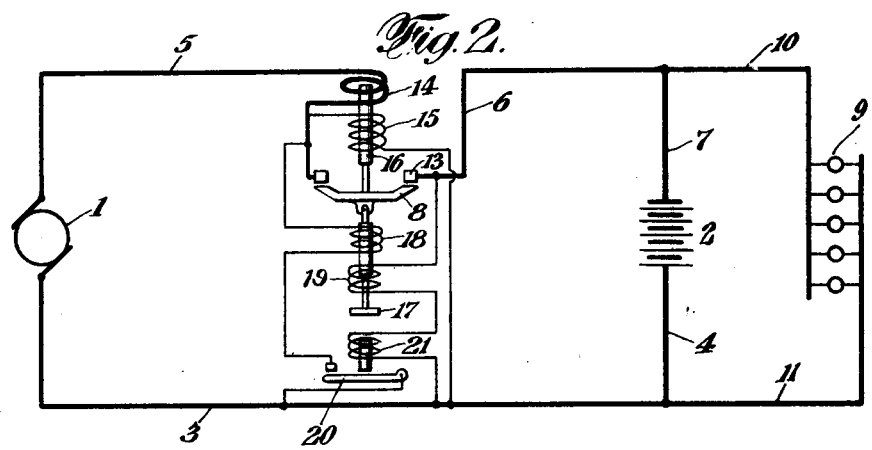
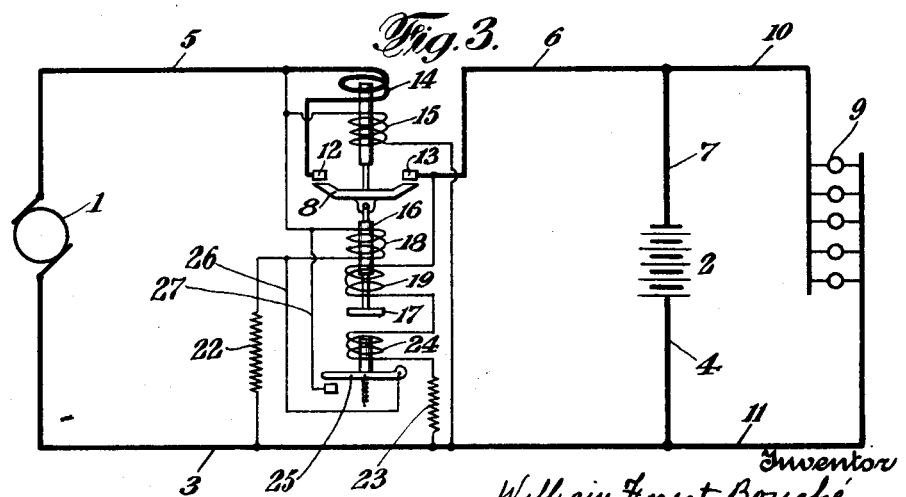
Inventor
William Forest Bouché
By his Attorneys
Ward Crosby & Smith Patented Apr. 9, 1929.

1,708,865

UNITED STATES PATENT OFFICE.

WILLIAM FOREST BOUCHÉ, OF BUFFALO, NEW YORK, ASSIGNOR, BY MESNE ASSIGNMENTS, TO SIMPLEX EQUIPMENT COMPANY, INC., OF NEW YORK, N. Y., A CORPORATION OF DELAWARE.

ELECTRICAL SYSTEM.

Application filed December 31, 1925. Serial No. 78,519.

My invention relates to improvements in electrical systems and more particularly to systems wherein a generator is connected to charge a storage battery and is adapted to be connected thereto by an automatic switch. In railway car lighting systems it is common to provide a generator driven at variable speed as from the car axle and to provide a main switch which automatically connects the generator to the battery and lamps when the speed of the generator reaches a value such that the generator will supply the desired voltage. In such switches the movable switch member is usually moved by gravity to open the switch and is operated by a solenoid or other electroresponsive device to close the switch. Gravity being thus the sole means of holding the switch open, it is found that in some cases, due to jolting of the car or for other reasons, the force of gravity is not sufficient to maintain the switch open and it accidentally closes, with the result that a heavy discharge is likely to take place from the battery through the generator which may cause the blowing of fuses or more serious damage.

The main object of the present invention is to provide a simple and efficient arrangement for preventing such accidental closing of the main switch. Further and more specific objects, features and advantages will more clearly appear from the detail description given below taken in connection with the accompanying sheet of drawings forming a part of this specification.

In the drawings, Fig. 1 is a diagram illustrating my improvements in one form. Fig. 2 is a similar diagram illustrating a modification and Fig. 3 is another similar diagram illustrating a further modification.

Referring to Fig. 1 of the drawing, 1 represents a generator or dynamo driven at variable speed as from the axle of a railway car and 2 represents a storage battery connected to be charged thereby. One terminal of the generator is connected with the storage battery by conductors 3 and 4 while the other terminal of the generator is adapted to be connected with the storage battery by conductors 5, 6 and 7 through a main switch 8 in the lead 5, 6. The generator is also adapted at the proper time to feed lamps or other translating devices 9 through the conductors 10 and 11 and when the generator is not running, or not running at sufficient speed, the lamps or translating devices will be energized from the battery 2.

The main switch 8 is adapted to electrically connect the fixed contacts 12 and 13 when the switch member 8 is raised. In the arrangement shown a solenoid is provided for this purpose comprising a coil 14 in series in the conductor 5 and the potential coil 15 connected across the generator. The solenoid comprising coils 14 and 15 is arranged to act upon a core 16 mechanically connected with the switch member 8. The parts are so designed, as will be understood by those skilled in the art, that when the voltage of the generator reaches the desired value whereby it may be effectively connected with the battery the strength of coil 15 will be such as to raise the switch member 8 against the action of gravity and so close the switch whereupon current will pass from the generator to the battery and/or lamps. Coils 14 and 15 are so wound that this current passing from the generator will cause coil 14 to assist coil 15 and thus tend to hold the switch closed. When however the generator voltage decreases, due to a decrease in speed, to such a point that the battery tends to discharge through the generator, then the current is reversed in coil 14 whereby it opposes the coil 15 and weakens the solenoid, permitting or causing the switch 8 to open by gravity.

Pivotally suspended by switch member 8, I have shown another solenoid core 16 adapted to rest upon the stop 17 when the switch 8 is open. Core 16 is adapted to be operated by a solenoid comprising a potential coil 18 connected across the generator and a potential coil 19 connected across the battery. These coils 18 and 19 are wound so that they oppose one another. When the main switch is closed so that the voltage applied to each is substantially the same, the coils 18 and 19 substantially neutralize one another. When however the switch 8 is open which, under normal conditions, is when the generator is running at below critical speed, the voltage applied to coil 18 will be less than that applied to coil 19 whereby the solenoid produces a substantial pull on the core 16 tending to hold the main switch 8 open and thus prevent the same from being accidentally closed by a jolting of the car or otherwise.

When however the generator again speeds up so that its voltage substantially equals that of the battery, then the coils 18 and 19 substantially neutralize one another so that they have no material tendency to hold switch 8 open whereby it may be closed automatically in the usual or desired manner.

It will be noted however that should the battery circuit 4, 7 become opened accidentally or for any reason and the generator should be started up to supply the lamps, then a situation would arise in which, prior to the closing of the switch 8, coil 19 would remain de-energized while the coil 18 would build up and thus tend to hold the main switch open at the very time when it would be desired to have it closed. This however may be taken care of by so proportioning the winding of the coils 18 and 15 that the pull of the former is only a small fraction of the pull of the coil 15. However, in order to prevent the coil 18 from having any substantial tendency to hold the main switch open when it is desired to cut in the generator by closing the main switch, I may provide an arrangement as shown in Fig. 2 wherein 20 represents a relay switch connected in series in circuit with coil 18, and 21 represents an electromagnet connected in series in circuit with the coil 19, magnet 21 being adapted to close the switch 20 whenever the coil 19 is energized. Thus when the battery is energized the coil 19 and the magnet 21 will also be energized and maintain the switch 20 closed so that the coil 18 will be connected across the generator. But should the circuit from the battery to the coil 19 become open for any reason, then coil 19 and also magnet 21 will become deenergized which will cause the switch 20 to be opened so that the circuit through coil 18 is opened and coil 18 will be rendered ineffective and will not have any tendency to maintain the switch 8 open so long as the coil 19 is deenergized.

Referring to Fig. 3, the arrangement there shown is substantially the same except that a high resistance 22 is connected in series with coil 18 and the high resistance 23 is connected in series with coil 19, a magnet 24 being also connected in series with the coil 19 and adapted to operate a switch 25 which when the magnet 24 is de-energized so that the switch 25 is closed, the coil 18 is short circuited through the conductors 26 and 27. Thus whenever the coil 19 becomes de-energized as by reason of an open battery circuit or for any other reason, switch 25 will be closed thus rendering ineffective coil 18 so that it will not have any material tendency to hold the main switch 8 open at the time it is desired to connect the generator to the circuit 10—11.

While I have described my improvements in great detail and with respect to certain preferred embodiments thereof, I do not desire to be limited to such details or embodiments since many changes and modifications may be made and the improvements embodied in widely different forms without departing from the spirit and the scope thereof in the broader aspects of the invention. Hence I desire to cover all modifications and forms coming within the language or scope of any one or more of the appended claims.

What I claim as new and desire to secure by Letters Patent is:

1. An electrical system having in combination a generator, a storage battery connected in circuit with the generator, a switch in circuit between the generator and battery, electroresponsive means controlling the operation of the switch, and electroresponsive means tending to hold said switch in open position, said last mentioned electroresponsive means including a potential coil responsive to the potential of the generator and an opposing potential coil responsive to the potential of the battery, and means for rendering ineffective the generator potential coil, upon de-energization of the battery potential coil.

2. An electrical system having in combination a generator driven a variable speed, a storage battery and lamps connected to be supplied thereby, a main switch for connecting and disconnecting the generator to and from the battery and lamps, electroresponsive means controlling the operation of said switch and acting to cause the switch to be closed when the voltage of the generator reaches a predetermined value, and electroresponsive means tending to hold said switch in open position, said last mentioned electroresponsive means including a potential coil responsive to the potential of the generator and an opposing potential coil responsive to the potential of the battery, and means for de-energizing the generator potential coil responsive to a de-energization of the battery potential coil.

3. An electrical system having in combination a generator, a storage battery connected in circuit with the generator, a switch in circuit between the generator and battery, electroresponsive means controlling the operation of the switch, and electroresponsive means tending to hold said switch in open position, said last mentioned electroresponsive means including a potential coil responsive to the potential of the generator and an opposing potential coil responsive to the potential of the battery and means for short-circuiting the generator potential coil responsive to a de-energization of the battery potential coil.

4. An electrical system having in combination a generator, a storage battery connected in circuit with the generator, a switch in circuit between the generator and battery, electroresponsive means controlling the operation of the switch, and electroresponsive means tending to hold said switch in open position, said last mentioned electroresponsive means including a potential coil connected across the generator and an opposing potential coil connected across the battery, both of said coils acting electromagnetically on a member connected with the movable member of the switch, said two coils substantially neutralizing one another when the switch is closed, and means for de-energizing the coil across the generator responsive to a de-energization of the coil across the battery.

5. An electrical system having in combination a generator, a storage battery connected in circuit with the generator, a switch in circuit between the generator and battery, electroresponsive means controlling the operation of the switch, and electroresponsive means tending to hold said switch in open position, said last mentioned electroresponsive means including a potential coil connected across the generator and an opposing potential coil connected across the battery, said two coils substantially neutralizing one another when the switch is closed, and means for rendering the coil across the generator substantially ineffective responsive to a de-energization of the coil across the battery.

6. An electrical system having in combination a generator, a storage battery connected to be charged thereby, a switch for connecting and disconnecting the generator and battery, said switch being opened by gravity, electroresponsive means for closing said switch and electroresponsive means tending to hold said switch in open position, said last mentioned electroresponsive means including a potential coil connected across the generator and an opposing potential coil connected across the battery and means for rendering the coil across the generator substantially ineffective responsive to a de-energization of the coil across the battery.

7. An electrical system having in combination a generator, a storage battery connected to be charged thereby, a switch for connecting and disconnecting the generator and battery, said switch being opened by gravity, electroresponsive means for closing said switch and electroresponsive means tending to hold said switch in open position, said last mentioned electroresponsive means including a potential coil connected across the generator and an opposing potential coil connected across the battery, both of said coils acting electromagnetically on a member connected with the movable member of the switch and said two coils substantially neutralizing one another when the switch is closed and means for rendering the coil across the generator substantially ineffective responsive to a de-energization of the coil across the battery.

In testimony whereof I have signed my name to this specification.

WILLIAM FOREST BOUCHÉ.